United States Patent [19]

Gryglas

[11] Patent Number: 4,721,380

[45] Date of Patent: Jan. 26, 1988

[54] PORTABLE OPAQUE PROJECTOR

[75] Inventor: Stephen Gryglas, Long Grove, Ill.

[73] Assignee: Constantin Systems, Inc., Chicago, Ill.

[21] Appl. No.: 42,563

[22] Filed: Apr. 23, 1987

Related U.S. Application Data

[63] Continuation of Ser. No. 704,398, Feb. 22, 1985, abandoned.

[51] Int. Cl.$^4$ ............................................. G03B 21/06
[52] U.S. Cl. ....................................... 353/66; 353/119; 353/72; 353/79
[58] Field of Search ........................ 353/63, 3, 65–67, 353/72, 73, 79, 98, 99, DIG. 4, 119, 71, 75, 122; 350/608, 609, 631, 641

[56] References Cited

U.S. PATENT DOCUMENTS 1,202,754  10/1916  Patterson ............................. 353/66
1,485,147   2/1924  Patterson ............................. 353/63
1,787,279  12/1930  Mageoch ........................... 353/98 X
2,847,901   8/1958  Sassaman et al. ................. 353/77 X
3,361,131  11/1968  Barger ............................. 350/632 X

FOREIGN PATENT DOCUMENTS 3544  of 1914  United Kingdom ................. 353/63
385104  12/1932  United Kingdom ................. 353/65

Primary Examiner—Harry N. Haroian
Attorney, Agent, or Firm—Willian Brinks Olds Hofer Gilson & Lione Ltd.

[57] ABSTRACT

An improved portable opaque projector with superior performance and portability is characterized by a transportable mode and an operable mode. When in its operable mode the top is removed and a removable mirror is mounted to the projection lens, and the projector sides are extended. Improved means for mounting a mirror proximate the extendable projection lens and in fixed vertical relationship thereto as the lens is rotatably extended for focusing, is provided. An improved mirror structure for preventing non-planar distortion of the mirror surface is also provided.

11 Claims, 9 Drawing Figures

PORTABLE OPAQUE PROJECTOR

This application is a continuation of application Ser. No. 704,398, filed Feb. 22, 1985, now abandoned.

BACKGROUND OF THE INVENTION

This invention relates to an improved episcopic image projection system, i.e., projection system which reflects light from a graphic sheet onto a screen or other suitable surface. Such systems are distinguished from diascopic image projection systems wherein light passes through the graphic sheet en route to the screen. Because light in the episcopic system does not have to pass through the graphic sheet, opaque graphic sheets rather than transparent graphic sheets can be utilized. For this reason episcopic image projection systems are commonly referred to as opaque projectors.

Opaque projectors have the inherent advantage that plain paper graphics, and even three-dimensional objects, can be projected without special preparation. This, of course, eliminates the time and expense needed to prepare transparencies of each graphic which are required in diascopic image projection systems. Moreover, the use of plain paper graphics in opaque projectors gives the user an element of spontaneity and versatility during a visual presentation which is not available in diascopic systems.

In spite of their many benefits, opaque projectors have had limited commercial acceptance and success. Numerous factors such as cost, size, weight, operation difficulties, image diffusion and the like may account for this situation.

Accordingly, there have been several attempts over the years to produce a compact opaque projector which is capable of achieving excellent optical results. Some of these attempts are described in U.S. Pat. Nos. 3,951,535; 3,947,103; 3,915,567; 3,837,739; 3,778,142; 3,512,883; 2,596,393; Re. No. 28,274; and Swedish Patent No. 172,201. Other image projection systems are disclosed in U.S. Pat. Nos. 3,900,253; 3,752,574; 3,366,005; 3,257,898; 3,190,174; and 1,988,522.

An improved portable opaque projector is described by U.S. Pat. No. 4,468,105. In the device described therein, which has both an operable mode and a portable mode, the hinged lid of the projector case is raised and secured at an acute angle with respect to the projection lens, and a reflecting mirror is then supported by the raised lid. However, a relatively large reflecting mirror is required because of the resulting configuration. Such a mirror is also subject to non-planar distortion and to vibration transmitted through the lid itself, which detract from the quality of the projected image. The size of the necessary mirror further detracts from the economy and portability of the resulting projector.

Accordingly, it is an object of this invention to provide an improved opaque projector, and particularly an improved portable opaque projector. Another object is the provision of such a projector which may have a completely removable lid, and which is sufficiently compact and portable to enable it to be readily stored and transported, yet sufficiently uncomplicated to be easy to assemble and use. A related object is to provide such an improved portable opaque projector which includes a stable means for mounting a reflecting mirror of minimum size, to enhance portability and minimize projected image distortion. A further object is to provide a mounting means for a reflecting mirror which allows use of a mirror of minimum dimensions in such a projector. Another object is to provide a mirror structure for such a projector which minimizes or eliminates non-planar distortions in the reflecting surface. Other objects, features and advantages of the invention will become apparent hereinafter.

SUMMARY OF THE INVENTION

The objects, features and advantages of the invention are achieved in an opaque projector characterized by a transportable mode and an operable mode, in which the projector comprises case means including end panels, side panels, and a base. A projection lens extends from the top of the projector. Means attached to the lens are provided for mounting a removable reflecting mirror to the lens itself, which may be movable relative to the projector case to focus a projected image.

In another aspect of the invention, there is provided a method for converting an opaque projector, characterized by case means having end panels, side panels, and a base, from a transportable mode to an operable mode. The method comprises removing a mirror from a stored position inside the case, placing the mirror in support means cooperating with the projection lens and proximate to the upper surface of the lens, and maintaining the mirror at an acute angle with respect to the projection lens.

In another aspect of the invention, a mounting means is provided which cooperates with a projection lens to provide means for mounting a reflecting mirror generally above the projection lens, such that the mirror is transported in relatively fixed vertical relationship to the projection lens as the lens is rotatably moved to effect focusing. In yet another aspect, a reflecting mirror structure is provided which includes resilient isolation of the reflective element within a substantially rigid frame, to prevent stress in the mounting frame from distorting the planar surface of the reflecting element.

Other aspects of the invention, including numerous features and advantages, are explained in greater detail hereinafter.

DETAILED DESCRIPTION OF PREFERRED EMBODIMENTS OF THE PRESENT INVENTION

Figure 1:
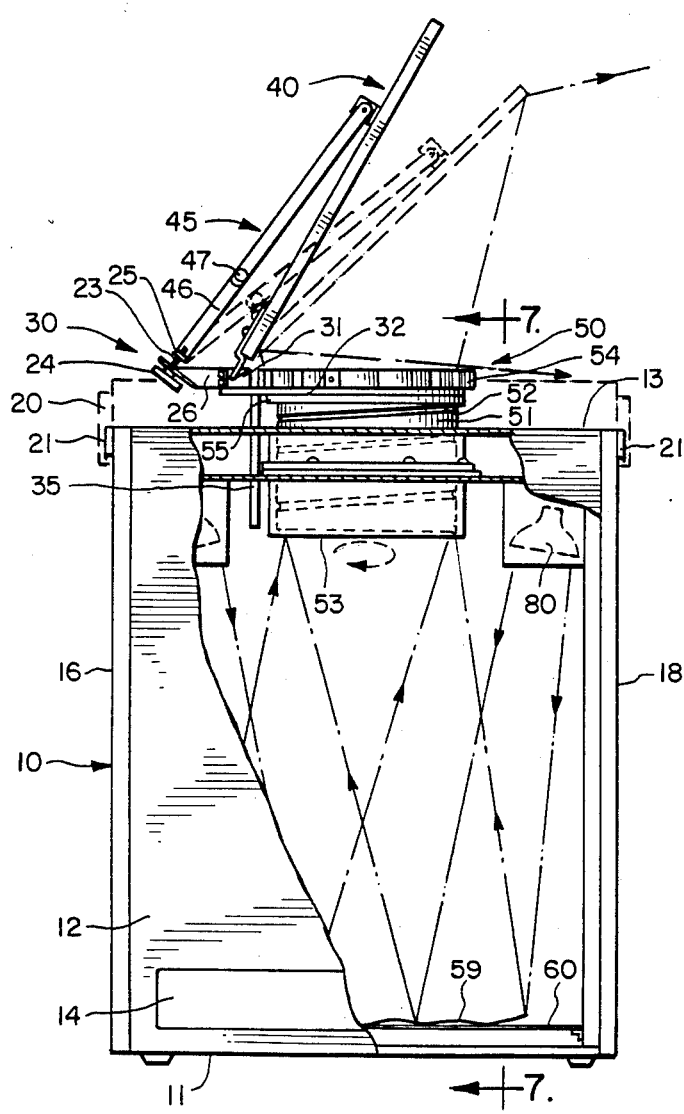
FIG. 1 is a partially cut-away side view of one embodiment of an opaque projector according to the present invention.
Figure 7:
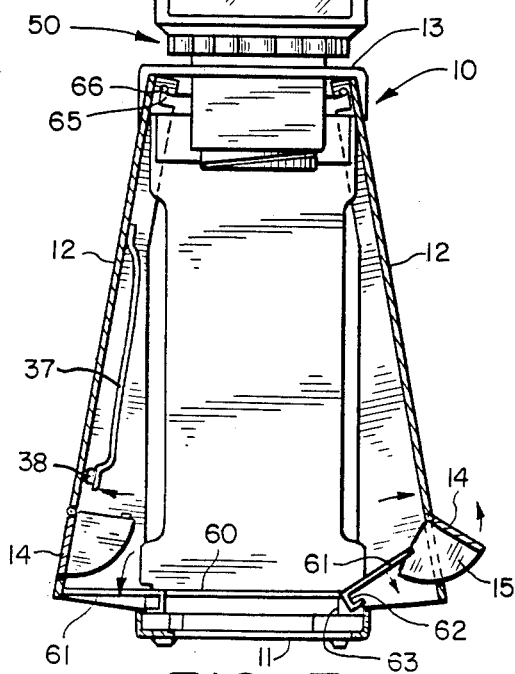
FIG. 7 is a front sectional view of the opaque projector taken along line 7—7 of FIG. 1.

Referring to the figures, preferred embodiments of an improved opaque projector are identified by reference numeral 10. FIGS. 1 and 7 illustrate projector 10 in its operable mode. It includes a front panel 18 and a rear panel 16, which are preferably parallel. Panels 18 and 16 are attached to a rectangular base 11 and a rectangular top 13. The front and back panels 18 and 16 are preferably perpendicular to base 11 and top 13.

The case of projector 10 further includes side panels 12, which are removably and pivotally connected, for example by means of mounting slots 65 cooperating with mounting pins 66, as illustrated in FIG. 7. Sides 12 may therefore be selectively moved from a first transportable or closed position, illustrated in FIG. 8, to a second operable or open position, illustrated in FIG. 7.

Projector 10 further includes graphic support platen 60, which is proximate base 11 and designed for supporting a graphic 59 for projection. As shown in FIG. 7, graphic support platen 60 includes platen extension members 61 which are pivotally connected to support platen 60. In the operable mode, extension members 61 are folded down and into alignment with support platen 60, increasing the effective size of the graphic platen. Alignment may be achieved by providing depending sides 62 on platen extension members 61, which engage side pieces 63 when in the operable position. Suitable pivotal connection of the platen extension members 61 to the support platen 60 may be provided by any means known in the art. For example, it has been found that adhering a platen surface cover fabric, preferably flat black to prevent undesired reflection, to the upper surface of the platen 60 and extensions 61 provides suitable hinged connection.

Projector 10 is further provided with illumination means such as lamps 80, and a projection lens 50 extending through and perpendicular to top 13. Light from lamps 80 is reflected by graphic 59 to projection lens 50. Lens 50 projects the light upwardly to reflecting mirror structure 40, which reflects the image to the receiving screen for viewing.

In order to permit compact portability, mirror structure 40 is removable from projector 10. Mirror mounting means 30 described more fully herein are provided for mounting the removable mirror structure 40 to the projector in its operable mode, including means for adjusting the angle of the mirror with respect to the projection lens to adjust location of the projected image on the receiving screen. A specialized structure more fully described in connection with FIGS. 2 and 4 may be provided to minimize distortions resulting from nonplanar distortions of the mirror. In its transportable mode, the mirror structure 40 may be detached from the projector 10 and secured within the projector case for storage and transportation.

Figure 8:
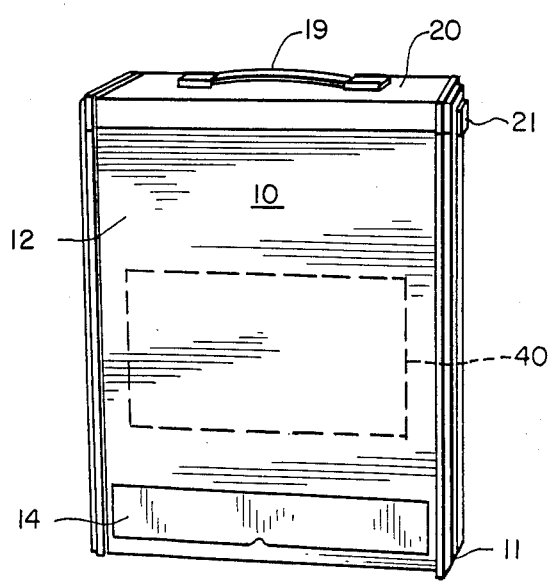
FIG. 8 is a side perspective view of the portable opaque projector in its transportable mode.

Finally, a removable lid 20 with handle 19 may be secured over top 13 of projector 10 when in the transportable mode by means of latches 21, as shown in FIG. 8, and in phantom in FIG. 1. Lid 20 thereby protects projection lens 50 and the top 13 of the projector 10 during storage and transportation, but may be completely removed during operation.

Referring generally to FIGS. 1, 7, and 8, it is seen that projector 10 is readily changed from its transportable mode to its operable mode. In the transportable mode, the platen extensions 61 are folded in, and sides 12 are retracted to a closed position preferably parallel to one another. The mirror structure 40 is removed, and preferably stored within the projector case. For example, straps 37 and securing means such as Velcro or snap closures 38 may be provided on one of the sides 12 to secure the mirror structure 40 in a position illustrated in phantom in FIG. 8. Other means for securing the mirror may similarly be used, or the mirror may be stored in other locations within the projector. In a preferred embodiment, means are similarly provided for securing a removable power cord within the interior of the case.

When deploying the projector from its transportable mode to its operable mode, the removable lid 20 may first be removed, exposing projection lens 50 and the mirror mounting means 30. The side 12 holding the mirror structure 40 may then be removed to obtain access to the mirror structure and the interior of the projector. The power cord may similarly be removed and attached as appropriate.

In general, side panels 12 are pivoted outward to their operable position, and platen extension members 61 are extended outward. Sides 12 may cooperate with the platen extensions 61 to retain the sides in their extended, operable position, as shown in FIG. 7.

The mirror structure 40 is then inserted into the mirror mounting means 30 and secured thereto. The projection lens 50 may be extended as necessary to focus the projected image, and the angle of the mirror structure 40 may be adjusted as necessary to position the projected image on the receiving screen.

During operation, access to the graphic support platen 60 for purposes of inserting or removing graphics 59 may be obtained by removing one of the side panels. However, to minimize undesired ambient light and glare, access panels 14 may be provided in sides 12 proximate the support platen 60. Panels 14 are hingedly connected, as illustrated in FIG. 7, and may include end plates 15 to further minimize glare. Thus, in operation the access panels 14 may be folded down to prevent light from escaping the projector, but may be selectively raised as necessary to gain access to the support platen 60.

Upon completion of the operation, the projector may be returned to its transportable mode by first removing the mirror structure 40, then retracting the projection lens 50. The mirror structure 40 is secured to side panel 12, and the power cord may be similarly stored. Platen extensions 61 are folded inwardly, and side panels 12 may then be secured in their retracted transportable position. Finally, the protective removable lid 20 may be applied.

Referring now to FIG. 1, a preferred embodiment of the mirror mounting means 30 is described. It has been found preferable to mount the mirror structure 40 such that its base remains in a fixed vertical location with respect to the top of projection lens 50 as the lens is extended and retracted for focusing, thereby minimizing the distance between the mirror and the projection lens. In this manner, a mirror of minimum dimensions may intercept and reflect the entire projected image, unlike structures which allow variable spacing between a mirror and the projection lens and therefore must accommodate, in the worst case where the lens is retracted a maximum distance from the mirror, a substantially larger projection cone.

In the preferred embodiment, projection lens 50 is focused by changing the distance between the lens and the graphic 59. This is accomplished by providing a spiral groove 52 on the lens barrel 51, which cooperates with thread engagement means of sheath 53 connected to top 13. A knurled grip ring 54 may be provided to facilitate grasping the upper portion of the projection lens 50 to rotate the lens relative to projector 10 and sheath 53, resulting in extension or retraction of the projection lens 50. Other means known in the art may similarly be provided for selectively extending or retracting projection lens 50.

Figure 2:
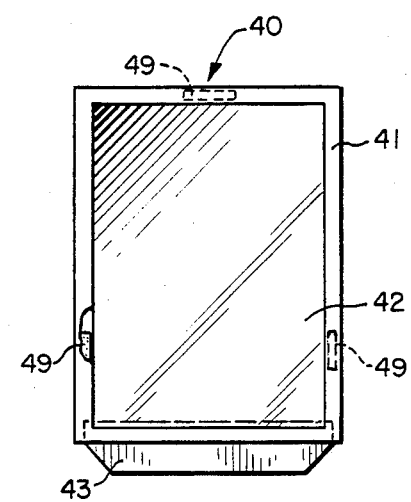
FIG. 2 is a partially cut-away front view of the mirror structure.
Figure 4:
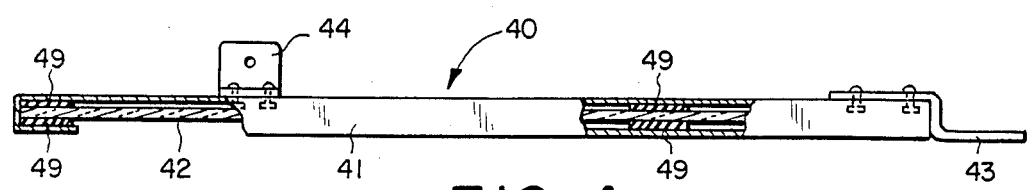
FIG. 4 is a partially cut-away side view of the mirror structure.

In order to permit use of a mirror of minimum size, means are provided for mounting the mirror in fixed relationship relative to the top of projection lens 50. In this manner, as lens 50 is extended and retracted, the mirror structure 40 is transported therewith. Specifically, in a preferred embodiment a support block 31 is mounted proximate the upper surface of the lens 50 by means of a mirror mount collar 32. The support block 31 has a "V" slot 76 running lengthwise therethrough, as more clearly illustrated in FIG. 5. The removable mirror structure 40 includes a mounting tab 43 attached to the bottom of a metal support frame 41, as shown in FIGS. 2 and 4. The "V" slot 76 is designed to cooperate with and receive mounting tab 43. The upper and lower walls of the "V" slot 76 define an acute angle with respect to one another, to permit a restricted range of rotation of the mirror structure 40 about a pivot point defined by the interface between mounting tab 43 and the bottom of "V" slot 76. It is understood that alternative means known in the art for providing such pivotal support may similarly be utilized.

Figure 6:
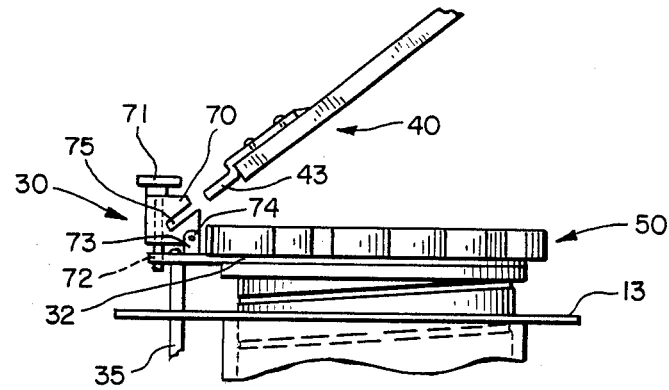
FIG. 6 is a side view of another embodiment of mirror mounting means.

Although less preferred embodiments such as shown and discussed in connection with FIG. 6 provide for cantilever support of the reflecting mirror by means of a single attachment point such as mounting tab 43, it has been found preferable to provide a second support point for the mirror structure 40. Such additional support provides for a more stable support, minimizing undesired movements and vibration of the mirror which distort the projected image. Further, it has been found that stress induced into the mirror in a cantilever structure cause non-planar distortion of the mirror surface, which degrades the projected image.

Accordingly, the preferred embodiment of the mirror structure 40 includes upper support means including a support bracket 44 located in the upper one-half of the support frame 41, as illustrated in FIG. 4. A support arm 45 is pivotally attached to the support bracket 44, and connected to a second support point displaced relative to support block 31. In this manner, the weight of mirror structure 40 is supported both by mounting tab 43 cooperating with support block 31, and by support bracket 44 cooperating with support arm 45.

In order to enhance compactness for purposes of storage and portability of the mirror structure 40 including support arm 45, the support arm 45 may include a lower link 46 connected by pivot 47, so that support arm 45 may be folded to reduce its length for storage.

In order to provide for adjustment of the angle of mirror structure 40 relative to the projection lens 50, means may be provided for adjusting the length of the support arm 45. In a preferred embodiment, a threaded connector 25 is provided on the end of support arm 45. A length adjustment screw 23 including an adjustment knob 24 is retained by a bracket 26 displaced from support block 31. The length adjustment screw 23 cooperates with the threaded connector 25 such that, when the adjustment knob 24 is rotated, the effective length of support arm 45 including length adjusting screw 23 is controlled. Means known in the art may be provided for retaining length adjustment screw 23 within bracket 26. Alternatively, length adjustment screw 23 may be retained relative to the threaded connector 25, and removably inserted into a slot in bracket 26 and retained therein by the natural bias of the weight of mirror structure 40 acting through support arm 45. It is understood that other means and methods known in the art for providing adjustable connection may similarly be employed.

Figure 3:
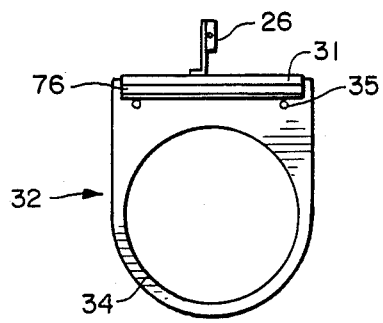
FIG. 3 is a top view of the mirror mount collar illustrated in FIG. 1.

In the preferred embodiment shown, projection lens 50 is focused by rotation as previously discussed. In order to accommodate such rotation without displacing the mirror radially in the horizontal plane, a sliding mounting means is provided. Specifically, as shown in FIG. 3, mirror mount collar 32 includes a collar portion 34 which defines a substantially circular aperture slightly larger than the outer diameter of the upper portion of lens barrel 51. The mirror mount collar 32 therefore substantially surrounds lens barrel 51, and is retained thereon by extending portions of knurled grip ring 54, as shown in FIG. 1. A retainer ring 55 is then applied and secured to the lens barrel 51 below the mirror mount collar 32, thereby firmly retaining the mirror mount collar 32 in a vertical direction relative to lens 50, while permitting free rotation of the collar 32 relative to the lens 50 as the lens is rotated within the aperture described.

In order to prevent rotation of the mirror mount collar 32 when the lens 50 is rotated, sliding rods 35 are attached to the mirror mount collar 32 and descend through aligned apertures in the top 13 of the projector 10. Interference between top 13 and the rods 35 retains the collar 32 in a fixed horizontal position relative to top 13 of projector 10, yet permits the mirror mount collar 32 to move vertically with respect to the top 13 in synchrony with lens 50 as the lens is extended and retracted. It is understood that other means known in the art for preventing rotation of collar 32 relative to top 13 of projector 10 may similarly be employed.

It has been found that stress induced into the glass mirror element of the mirror structure can cause serious nonplanar distortion of the reflecting surface which degrades the projected image. Although the method and apparatus for mounting the mirror described above minimize such problems, it has been found preferable to provide a specialized mirror structure 40 to further minimize or eliminate such problems. Specifically, as illustrated in FIGS. 2 and 4, a stiff support frame 41 is provided, which may include a back, sides, and front edges framing the mirror element itself. In a preferred embodiment, the frame 41 includes only the left side, top, and right side members, with the bottom being sufficiently open to permit insertion of the glass mirror 42. Mounting tab 43 may then be applied, closing the bottom and retaining the mirror.

The mirror 42 itself is preferably a first surface mirror to minimize distortion of the reflected image. Although frame 41 resists warping and distortion, it has been found to be generally insufficient for providing a high quality projected image free of any distortion. Accordingly, the present invention provides a system wherein the mirror is "floted" within the support frame 41. Specifically, the mirror 42 is retained in a spaced relationship from the mounting frame 41 by means of resilient pads 49. The pads 49 are preferably located between both the front and back surfaces of the mirror 42 and the frame 41 at three locations, as illustrated in FIG. 2, namely the top center, the lower left, and the lower right of the mirror. Pads 49 may preferably comprise cork pads adhesively attached to the mirror 42.

Figure 5:
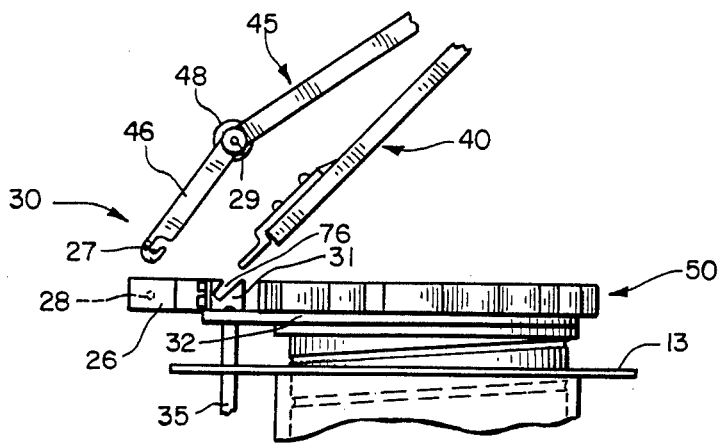
FIG. 5 is a side view of another embodiment of mirror mounting means.

Referring now to FIGS. 5 and 6, alternative embodiments for the mirror mounting means 30 are illustrated.

In FIG. 5, lower link 46 of the support arm 45 is provided with a hook 27 which may removably engage pin 28 on bracket 26. Adjustment of the angle of mirror structure 40 with respect to lens 50 may be accomplished by providing a frictional pivot 29 and cooperating locking knob 48, such that the angle between the upper portion of support arm 45 and lower link 46 may be adjusted and secured. Other means known in the art for providing adjustable length of the support arm 45 may similarly be employed.

FIG. 6 illustrates a cantilever mount which includes pivoted support block 70 attached to upward extending ears 73 of the mirror mount collar 32 by means of pivots 74. Slot 75 is dimensioned to firmly retain mounting tab 43. Adjustment screw 71 passing through pivoted support block 70 cooperates with a threaded engagement means 72 in the mirror mount collar 32, and provides angular adjustment of the pivoted support block 70. Although such cantilever support is found to be less desirable as previously discussed, a bracket 26, as illustrated in FIG. 5, may be mounted to the pivoted support block 70 for cooperating with a second support arm 45, thereby providing a preferred second point of support for the mirror structure 40 with a pivoted support block embodiment.

Figure 9:
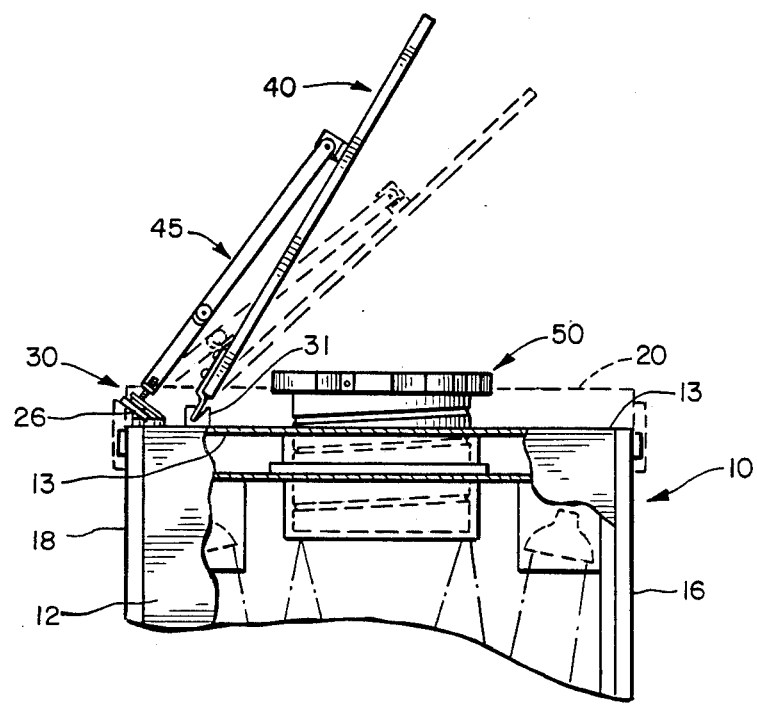
FIG. 9 is a side view of an alternative embodiment of the mirror mounting means.

FIG. 9 illustrates another less preferred aspect of the present invention wherein the mirror mounting means 30 are mounted to the top 13 of projector 10, permitting the lid 20 to be completely removed. In operation, the removable lid 20, shown in phantom, is removed from the projector 10 and the mirror structure 40 is placed in the mirror mounting means 30. Any of the mirror mounting means described, such as means including a support block 31 and bracket 26 for securing a support arm 45, may be utilized. In order to minimize vibrations transmitted to the mirror structure, such as from the cooling fans of projector 10, resilient vibration absorption means (not illustrated) known in the art may be used to provide isolation of the mirror mounting means 30. However, when used in connection with projection lens 50 which is relatively extendable and retractable, such an embodiment may require use of a larger mirror structure as previously described.

In a preferred embodiment of projector 10, lens 50 is a projection lens characterized by the following parameters: $f=2.7$, $FL=14.5''$, $Mag.=4.8:1$. Mirror 42 is a first surface glass mirror. Lamps 80 are ENX 360W 82D lamps, preferably operated in series with half wave rectifiers.

What has been described is an improved opaque projector providing superior operation with enhanced portability. An improved mirror mounting means, and improved mounting frame and method for the glass mirror, are provided. Though the embodiments of the invention disclosed herein are preferred, numerous refinements and alterations will be apparent to those skilled in the art. Accordingly, it should be understood that the present invention may be embodied in other specific forms without departing from its spirit or essential characteristics. The present embodiments are, therefore, to be considered in all respects as illustrative and not restrictive. All changes which come within the meaning and range of the equivalents of the claims are, therefore, intended to be embraced therein.

I claim:

1. An opaque projector characterized by a transportable mode and an operable mode comprising:
    case means including end panels, side panels, a base, and a top surface;
    removable mirror means;
    lens means; and
    means attached to said lens means for removably mounting said removable mirror above said top surface at an acute angle with respect to said lens means,
    said attachment means comprising a sliding collar means;
    said sliding collar means substantially surrounding said lens means and defining an aperture slightly larger than the outer diameter of a cooperating portion of said lens means, whereby said sliding collar means is rotatable about said lens means;
    means cooperating with said lens means for retaining said sliding collar means on said lens means while permitting rotation of said sliding collar means; and
    means cooperating with said sliding collar means to retain said sliding collar means in a fixed horizontal radial position relative to said case means, independent of said rotation of said lens means with respect to said case means.

2. The projector defind in claim 5 wherein said mirror mounting means includes means for adjusting said acute angle of said mirror means with respect to said top surface of said projector.

3. The projector defined in claim 1 wherein said side panels are in a closed position and said removable mirror is removed from said mirror mounting means when said projector is in said transportable mode, said side panels defining substantially parallel planes substantially perpendicular to said base when in said closed position; and
    at least one of said side panels is movably mounted to said case means and adapted to swing to an open position to form an acute angle with respect to the plane defined by said one of said panels in said closed position, when said projector is in said operable mode.

4. The projector defined in claim 1 further comprising:
    a graphic support platen adjacent said base;
    platen extension means proximate said graphic support platen and movable between a first raised position wherein said platen extension means are disposed substantially above said graphic support platen and within the interior of said case means when in a transportable mode; and a lowered position adjacent and substantially coplanar with said graphic support platen in a transportable mode when said one of said side panels is in said open position.

5. The projector defined in claim 1 wherein said one of said side panels includes an opening adjacent said graphic support platen, said opening providing access to said graphic support platen for placing a graphic thereon.

6. A mirror mounting apparatus, for use in opaque projectors and the like which include a case, a lens means rotatable with respect to said case, and a mirror, said apparatus comprising:
    sliding collar means, said sliding collar means substantially surrounding said lens means and defining an aperture slightly larger than the outer diameter of a cooperating portion of said lens means, whereby said sliding collar means is rotatable about said lens means;

means cooperating with said lens means for retaining said sliding collar means on said lens means while permitting rotation of said sliding collar means; and means for attaching said mirror, said attachment means connected to and deriving support from said sliding collar means.

7. The apparatus of claim 6 further comprising means cooperating with said sliding collar means to retain said sliding collar means in a fixed horizontal radial position relative to said case, independent of said rotation of said lens means with respect to said case.

8. The invention of claim 6 wherein said attachment means includes a first and a second means for securing said mirror, said first securing means located at a first position adjacent said lens means, and said second securing means located at a second position displaced from said lens means relative to said first location.

9. An opaque projector comprising:

case means;

removable mirror means;

lens means;

means for attaching said lens means to said case means such that said lens means is rotatable with respect to said case means and relatively extendable and retractable with respect to said case means; and means for removably attaching said removable mirror means to said lens means, such that said removable mirror means to above and at an acute angle with respect to said lens means;

said mirror attachment means comprising sliding collar means, said sliding collar means substantially surrounding said lens means and defining an aperture slightly larger than the outer diameter of a cooperating portion of said lens means, whereby said sliding collar means is rotatable about said lens means;

means cooperating with said lens means for retaining said sliding collar means on said lens means while permitting rotation of said sliding collar means; and means cooperating with said sliding collar means to retain said sliding collar means in a fixed horizontal radial position relative to said case means, independent of said rotation of said lens means with respect to said case means;

said removable mirror means thereby remaining in substantially fixed radial position relative to said case means, and in substantially fixed vertical spacing from said lens means, as said lens means is rotated and relatively extended and retracted with respect to said case means.

10. A mirror structure for use in connection with opaque projectors and the like, said mirror structure comprising:

a mirror;

a support frame, said support frame being substantially rigid and dimensioned for providing physical support of said mirror;

said mirror support frame comprising:

a back, said back having top, bottom, left, and right edges;

three sides attached respectively to said top, left and right edges of said back;

front frame members attached to said three sides and substantially parallel to said back;

means for attaching said mirror support frame to said opaque projector or the like; and means for attaching said mirror to said mirror support frame in spaced relationship to said mirror support frame, such that said mirror does not substantially contact said support frame, said mirror located within said mirror support frame and between said three sides, said mirror of a size sufficient to be partially covered by said front frame members without substantially contacting said three sides of said mirror support frame;

said spaced attachment means comprising resilient pads, said resilient pads positioned between said mirror support frame and said mirror, and located at a first position, a second position, and a third position relative to said mirror support frame, said first position located adjacent the top edge of said mirror at approximately the midpoint of said top edge of said mirror, said second position located adjacent the left edge of said mirror and within a region extending from the approximate midpoint of said left edge of said mirror and the bottom edge of said mirror, and said third position located adjacent the right edge of said mirror and within a region extending from the approximate midpoint of said right edge of said mirror and the bottom edge of said mirror;

said resilient pads thereby providing resilient and at least partially deformable connection between said mirror and said mounting frame, such that said mirror is at least partially isolated form distortion in said mounting frame.

11. The apparatus of claim 10 wherein two resilient pads are located at each of said three locations, a first of said two resilient pads lying between said back of said mirror support frame and said mirror, and a second of said two resilient pads lying between said front frame members and said mirror.

* * * * *